(12) United States Patent
Ravishankar

(10) Patent No.: US 11,483,062 B2
(45) Date of Patent: Oct. 25, 2022

(54) SYSTEM AND METHOD FOR SINGLE-HOP SESSIONS IN SATELLITE SYSTEM

(71) Applicant: HUGHES NETWORK SYSTEMS, LLC, Germantown, MD (US)

(72) Inventor: Channasandra Ravishankar, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 17/340,830

(22) Filed: Jun. 7, 2021

(65) Prior Publication Data

US 2021/0384964 A1    Dec. 9, 2021

Related U.S. Application Data

(60) Provisional application No. 63/034,982, filed on Jun. 5, 2020.

(51) Int. Cl.
| | |
|---|---|
| *H04B 7/185* | (2006.01) |
| *H04B 7/26* | (2006.01) |
| *H04W 56/00* | (2009.01) |

(52) U.S. Cl.
CPC ..... *H04B 7/18513* (2013.01); *H04B 7/18519* (2013.01); *H04B 7/2643* (2013.01); *H04W 56/0045* (2013.01)

(58) Field of Classification Search
CPC ............ H04B 7/18513; H04B 7/18519; H04B 7/2643; H04B 7/2125; H04W 56/0045
See application file for complete search history.

(56) References Cited

U.S. PATENT DOCUMENTS

| | | | |
|---|---|---|---|
| 5,790,939 A | 8/1998 | Malcom et al. | |
| 5,910,945 A * | 6/1999 | Garrison | H04B 7/2125 370/324 |
| 6,314,290 B1 | 11/2001 | Joshi et al. | |
| 2002/0193945 A1* | 12/2002 | Tan | H04B 7/2671 701/469 |
| 2010/0034190 A1* | 2/2010 | Yun | H04W 56/0035 370/350 |
| 2011/0268017 A1 | 11/2011 | Miller | |
| 2015/0270890 A1 | 9/2015 | Vasavada et al. | |
| 2017/0289939 A1 | 10/2017 | Hreha et al. | |
| 2018/0213500 A1* | 7/2018 | Li | H04W 56/0015 |

OTHER PUBLICATIONS

International Search Report and Written Opinion issued in International Application No. PCT/US21/36205, dated Sep. 17, 2021.

* cited by examiner

*Primary Examiner* — Ashley Shivers
(74) *Attorney, Agent, or Firm* — Potomac Technology Law, LLC

(57) ABSTRACT

A system and method are disclosed for providing single-hop communication sessions in a satellite network. A timing offset is selected based on a system timing reference, and used to establishing a common timing reference. A synchronization signal is transmitted from a gateway to a satellite based on time slots aligned with the common timing reference, and subsequently forwarded from the satellite to all terminals managed by the gateway. Communication sessions are initiated by terminals using the common timing reference, and downlink transmissions from the satellite to the terminals are aligned with the synchronization signal.

20 Claims, 13 Drawing Sheets

SYSTEM AND METHOD FOR SINGLE-HOP SESSIONS IN SATELLITE SYSTEM

CROSS-REFERENCE TO RELATED APPLICATION

The present application claims priority to U.S. Provisional Patent Application No. 63/034,982 filed Jun. 5, 2020, and entitled "System And Method For Single-Hop Sessions In Satellite System", the entire disclosure of which is incorporated herein by reference.

BACKGROUND INFORMATION

Satellite networks have emerged as an effective method for providing voice and data communication, particularly in areas that are not serviced by conventional service providers. Most satellite systems incorporate a star topology for establishing connectivity between different entities, such as two different user terminals (used interchangeably with "terminal" and "satellite terminal"). Communication typically occurs between terminals and a gateway along a bent pipe path facilitated by the satellite. For example, when one user terminal (UT-A) communicates with another user terminal (UT-B) in the satellite system, signals from user terminal UT-A reach a satellite gateway (used interchangeably with "gateway") which manages terminals within the coverage area. During this process, the signals from UT-A are transmitted along an uplink path to the satellite, and along a downlink path from the satellite to the gateway. The signals then are supplied to the core network, or appropriate connected systems. The gateway subsequently transmits the signals to the second user terminal UT-B via the satellite. Certain systems can utilize multiple gateways, wherein each gateway is assigned to manage specific beams within the coverage area. In such systems, the signals from user terminal UT-A are provided to a second gateway which manages the beam encompassing the location of user terminal UT-B. The second gateway subsequently transmits the signals to the second user terminal via the satellite. Such connectivity is often called a double-hop connection because the user-to-user link undergoes two satellite hops.

There are several disadvantages associated with such double-hop connectivity. When such a connection is used to establish voice sessions, the delay perceived by an end user in such a connection is that of two satellite hops plus any processing delays. As an example, geostationary satellites are positioned such that the delay incurred by transmissions between a user terminal is approximately 125 ms. Similarly, transmissions between a user terminal and the satellite incur a delay of approximately 125 ms. Consequently, the end-to-end delay perceived by the end users is greater than 500 ms (i.e., 125 ms from user-1 to satellite, 125 ms from satellite to first gateway, 125 ms from second gateway to satellite, and 125 ms from satellite to user-2). In addition, there can be processing delays at the different user terminals, gateways, and satellite. In many systems, including circuit-switched systems, the double-hop connectivity implies that there is multiple transcoding of voice signals. This transcoding can often lead to degradation of perceived voice quality. Furthermore, hop security breaches can occur in double-hop connectivity since signals traversing through the gateways can be potentially intercepted.

BRIEF SUMMARY

An apparatus system and method are disclosed for establishing single hop communication session in a satellite network. According to an embodiment, the system includes: a plurality of terminals; at least one gateway; and a satellite configured to facilitate communication between the plurality of terminals and the at least one gateway. The at least one gateway is configured to: select a timing offset based on a system timing reference, establish a common timing reference based on the timing offset and the system timing reference, and transmit a synchronization signal to a satellite based on time slots aligned with the common timing reference. The satellite is further configured to forward the synchronization signal, delayed by a value of the timing offset, on a downlink transmission to all terminals managed by the gateway, each of the terminals is configured to initiate a communication session using the common timing reference, and downlink transmissions from the satellite to the terminals are aligned with the synchronization signal in reference to a TDMA frame.

According to another embodiment, the system includes: a plurality of terminals; at least one gateway configured to: transmit a synchronization signal to the plurality of terminals based on time slots aligned with a system timing reference, and allocate resources for communication sessions; and a satellite comprising: a first antenna for communicating with the gateway; a second antenna for communicating with the plurality of terminals; and a buffer for storing data received from the plurality of terminals, wherein the satellite is configured to establish single-hop communication sessions between a first terminal and at least one additional terminal based on resources allocated by the gateway. The satellite is further configured to: store data received during uplink transmissions from the first terminal in the buffer during a single-hop communication session, reconfigure the second antenna from uplink to downlink transmission, and transmitting data stored in the buffer to the at least one additional terminal, and downlink transmissions from the satellite to the at least one additional terminal are aligned with the synchronization signal in reference to a TDMA frame.

According to another embodiment, the method includes: selecting a timing offset based on a system timing reference; establishing a common timing reference based on the timing offset and the system timing reference; transmitting a synchronization signal from a gateway to a satellite based on time slots aligned with the common timing reference; forwarding the synchronization signal, delayed by a value of the timing offset, on a downlink transmission from the satellite to all terminals managed by the gateway; and initiating a communication session, by at least one terminal, using the common timing reference, wherein downlink transmissions from the satellite to the terminals are aligned with the synchronization signal in reference to a TDMA frame.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

A system and method for establishing single-hop communication sessions are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
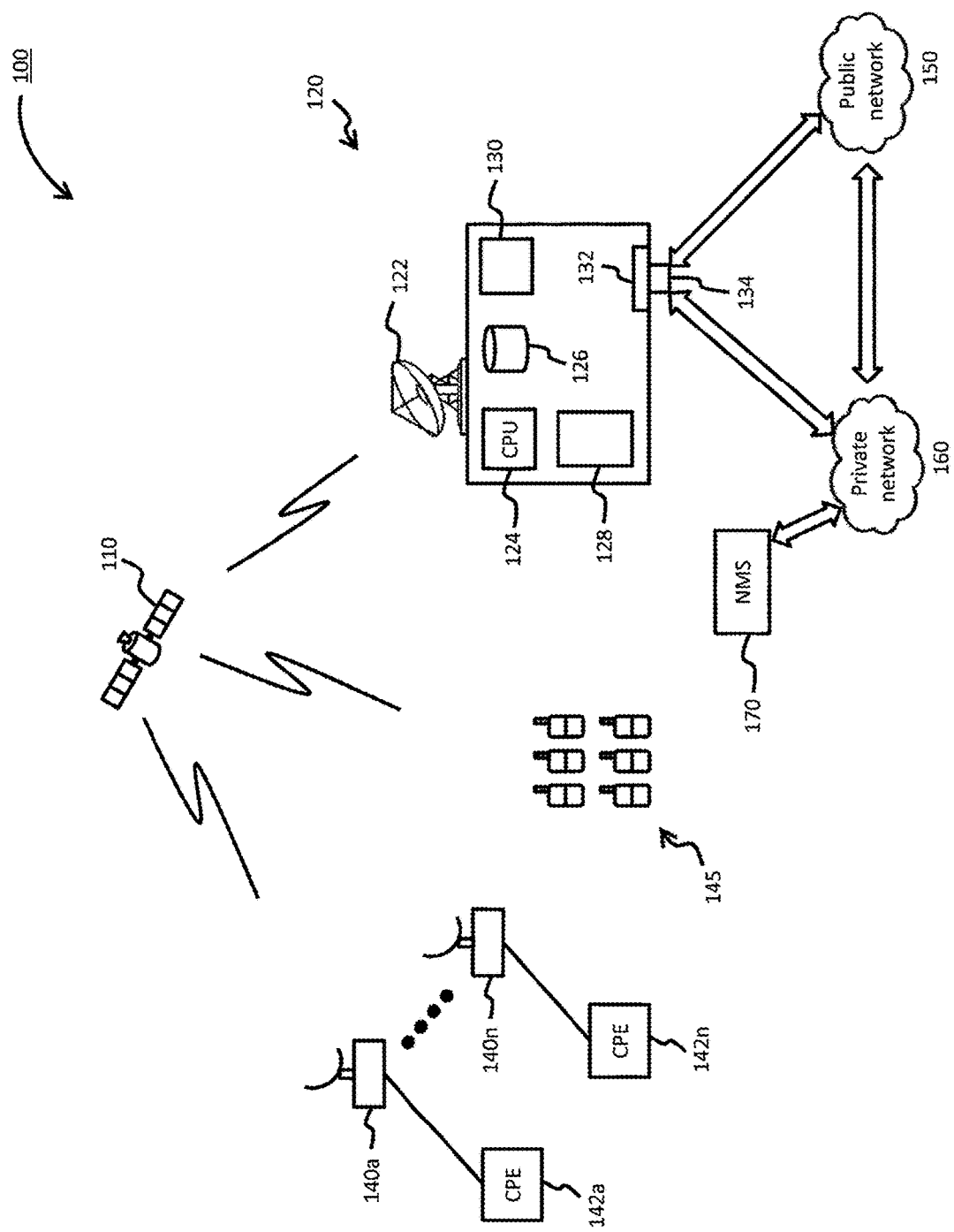
FIG. 1 is a diagram of a system capable of providing voice and data services, according to at least one embodiment.

FIG. 1 illustrates a satellite communication system 100 capable of providing voice and data services. The satellite communication system 100 includes at least one satellite 110 (only one shown) that supports communications among a number of gateways 120 (only one shown) and multiple stationary satellite terminals 140a-140n. Each satellite terminal (or terminal) 140 can be configured for relaying traffic between its customer premise equipment (CPEs) 142a-142n (i.e., user equipment), a public network 150 such as the internet, and/or its private network 160. Depending on the specific embodiment, the customer premise equipment 142 can be a desktop computer, laptop, tablet, cell phone, etc. Customer premise equipment 142 can also be in the form of connected appliances that incorporate embedded circuitry for network communication can also be supported by the satellite terminal (or terminal) 140. Connected appliances can include, without limitation, televisions, home assistants, thermostats, refrigerators, ovens, etc. The network of such devices is commonly referred to as the internet of things (IoT).

According to an exemplary embodiment, the terminals 140 can be in the form of very small aperture terminals (VSATs) that are mounted on a structure, habitat, etc. Depending on the specific application, however, the terminal 140 can incorporate an antenna dish of different sizes (e.g., small, medium, large, etc.). The terminals 140 typically remain in the same location once mounted, unless otherwise removed from the mounting. According various embodiments, the terminals 140 can be mounted on mobile platforms that facilitate transportation thereof from one location to another. Such mobile platforms can include, for example, cars, buses, boats, planes, etc. The terminals 140 can further be in the form of transportable terminals capable of being transported from one location to another. Such transportable terminals are operational only after arriving at a particular destination, and not while being transported.

As illustrated in FIG. 1, the satellite communication system 100 can also include a plurality of mobile terminals 145 that are capable of being transported to different locations by a user. In contrast to transportable terminals, the mobile terminals 145 remain operational while users travel from one location to another. The terms user terminal, satellite terminal, terminal may be used interchangeably herein to identify any of the foregoing types. The gateway 120 can be configured to route traffic from stationary, transportable, and mobile terminals (collectively terminals 140) across the public network 150 and private network 160 as appropriate. The gateway 120 can be further configured to route traffic from the public network 150 and private network 160 across the satellite link to the appropriate terminal 140. The terminal 140 then routes the traffic to the appropriate customer premise equipment (CPE) 142.

According to at least one embodiment, the gateway 120 can include various components, implemented in hardware, software, or a combination thereof, to facilitate communication between the terminals 140 and external networks 150, 160 via the satellite 110. According to an embodiment, the gateway 120 can include a radio frequency transceiver 122 (RFT), a processing unit 124 (or computer, CPU, etc.), and a data storage unit 126 (or storage unit). While generically illustrated, the processing 124 can encompass various configurations including, without limitations, a personal computer, laptop, server, etc. As used herein, a transceiver corresponds to any type of antenna unit used to transmit and receive signals, a transmitter, a receiver, etc. The RFT 122 is useable to transmit and receive signals within a communication system such as the satellite communication system 100 illustrated in FIG. 1. The data storage unit 126 can be used, for example, to store and provide access to information pertaining to various operations in the satellite communication system 100. Depending on the specific implementation, the data storage unit 126 (or storage unit) can be configured as a single drive, multiple drives, an array of drives configured to operate as a single drive, etc.

According to other embodiments, the gateway 120 can include multiple processing units 124 and multiple data storage units 126 in order to accommodate the needs of a particular system implementation. Although not illustrated in FIG. 1, the gateway 120 can also include one or more workstations 125 (e.g., computers, laptops, etc.) in place of, or in addition to, the one or more processing units 124. Various embodiments further provide for redundant paths for components of the gateway 120. The redundant paths can be associated with backup components capable of being seamlessly or quickly switched in the event of a failure or critical fault of the primary component.

According to the illustrated embodiment, the gateway 120 includes baseband components 128 which operate to process signals being transmitted to, and received from, the satellite 110. For example, the baseband components 128 can incorporate one or more modulator/demodulator units, system timing equipment, switching devices, etc. The modulator/demodulator units can be used to generate carriers that are transmitted into each spot beam and to process signals received from the terminals 140. The system timing equipment can be used to distribute timing information for synchronizing transmissions from the terminals 140.

According to an embodiment, a fault management unit 130 can be included in the gateway 120 to monitor activities and output one or more alerts in the event of a malfunction in any of the gateway components. The fault management unit 130 can include, for example, one or more sensors and interfaces that connect to different components of the gateway 120. The fault management unit 130 can also be configured to output alerts based on instructions received from a remotely located network management system 170 (NMS). The NMS 170 maintains, in part, information (configuration, processing, management, etc.) for the gateway 120, and all terminals 140 and beams supported by the gateway 120. The gateway 120 can further include a network interface 132, such as one or more edge routers, for establishing connections with a terrestrial connection point 134 from a service provider. Depending on the specific implementation, however, multiple terrestrial connection points 134 may be utilized.

Figure 2:
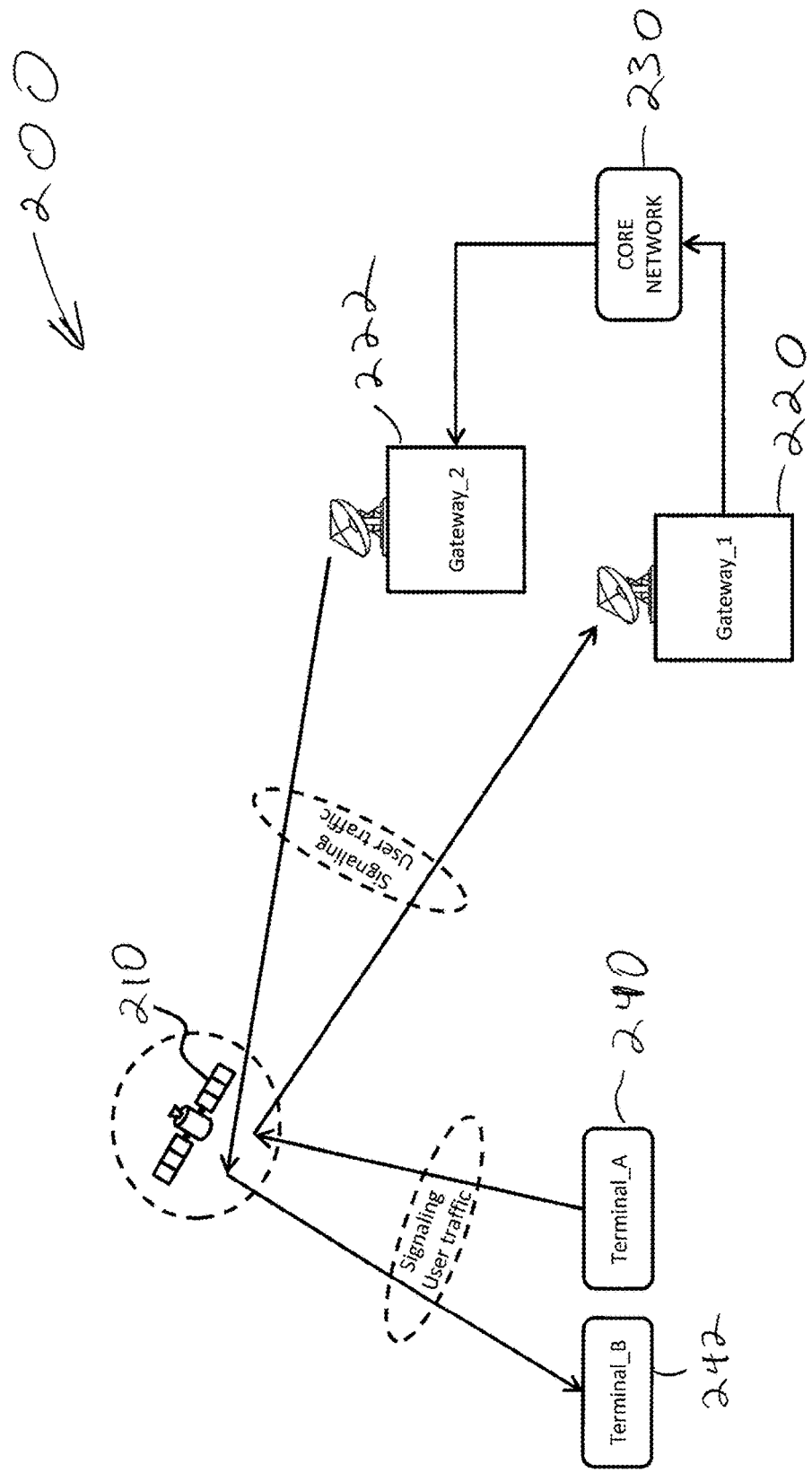
FIG. 2 is a diagram illustrating double-hop communication sessions using the system of FIG. 1.

FIG. 2 illustrates a system 200 for providing double-hop communication sessions. The system 200 includes a satellite 210, a first gateway 220, and a second gateway 222. The gateways (220, 222) operate in a manner similar to that described with respect to FIG. 1. For example, the first gateway 220 can be configured to manage communication within multiple beams generated by the satellite 210 over a particular coverage area. Similarly, the second gateway 222 can be configured to manage multiple beams generated by the satellite 210. Depending on the specific implementation, however, the system 200 can be equipped with only a single gateway which manages all beams within the coverage area. Furthermore, an additional gateway (or gateways can be provided for backup in the event of a failure or outage at the primary gateway. The system 200 also includes a core network 230 which provides management functionality pertaining to users and terminals that subscribe to service from the system 200. According to an embodiment, the core network 230 can provide management and operational functionality similar to the NMS shown in FIG. 1.

According to the illustrated embodiment, the system 200 includes a first terminal 240 and a second terminal 242 that take part in double-hop a communication session. For example, the communication session may correspond to a voice call between the first terminal 240 and the second terminal 242. According to the illustrated embodiment, the call is initiated by the first terminal 240 by transmitting signaling information to the first gateway 220. Thus, the first terminal 240 is located within a beam which is managed by the first gateway 220. The signaling information can be in the form of a request for resources to facilitate a voice call with the second terminal 242. Upon receiving the signaling information, the first gateway 220 interacts with the core network 230 in order to obtain information regarding the first terminal 240 and/or the second terminal 242. Such information can include status validation for the terminals in order to authorize the call (or communication session). For example, if the account associated with one of the terminals has been temporarily or permanently deactivated, the core network 230 would not authorize the call.

As illustrated in FIG. 2, the second terminal 242 is located within a beam that is managed by the second gateway 222. Accordingly, the core network 230 would communicate with the second gateway 222 in order to provide an indication that a call request has been received for the second terminal 242. The second gateway 222 would transmit signaling information to the second terminal 242 in order to indicate that a call request has been received. The second gateway 222 would also allocate resources for the second terminal 242 to communicate during the call session. Similarly, the core network 230 provides an indication to the first gateway 220 that the call request has been authorized. The first gateway 220 would then allocate resources for the first terminal 240 to utilize during the call session. Once the call set up is complete, communication between the first terminal 240 and the second terminal 242 proceeds via the satellite 210, the first gateway 220, the core network 230, and the second gateway 222. Depending on the specific system implementation, communication with the core network 230 may be omitted once the call has been established. Such implementations would, therefore, allow communication between the first gateway 220 and the second gateway 222.

The call procedure illustrated in FIG. 2 can have various disadvantages due to the number of transmissions required to establish and maintain the call session. Furthermore, once the call has been set up, communication must pass through both gateways prior to arriving at the intended destination. For example, voice traffic from the first terminal 240 must travel up to the satellite 210 and back down to the first gateway 220. The voice data would then be supplied to the second gateway 222, either directly from the first gateway 220 or via the core network 230. The second gateway 222 subsequently supplies the voice data to the second terminal 242 along a feeder link via the satellite 210. This process must be repeated each time voice data is transmitted from one of the terminals. This process can result in delays that adversely affect user experience.

Figure 3:
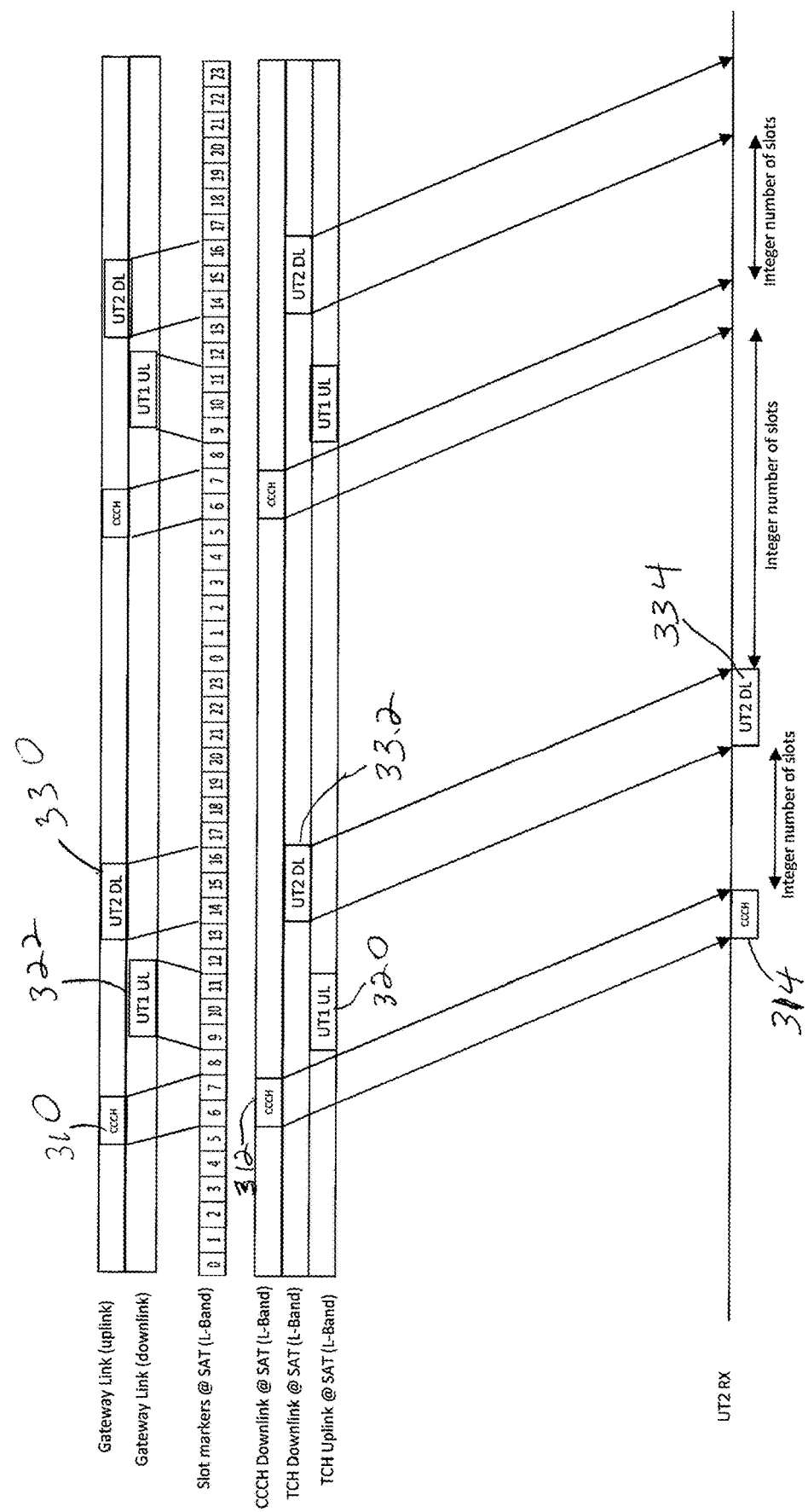
FIG. 3 is a diagram for illustrating data exchange between terminals during a double-hop communication session.

FIG. 3 is a diagram for illustrating data exchange between terminals during a double-hop communication session, such as the one previously described with respect to FIG. 2. At 310, the gateway transmits a synchronization signal on an uplink path to the satellite. According to at least one embodiment, the synchronization signal can be transmitted over Common Control CHannels (CCCH) within the system. As the name CCCH implies, these signals are common to all users in a given beam or region. The synchronization signal (or CCCH) corresponds to a signal used to establish a timing reference that is common to all terminals within a particular beam or region. The synchronization signal also allows transmissions between the satellite and gateway/terminals to be properly exchanged.

In TDMA-based satellite systems, for example, timing synchronization is typically defined with respect to a common timing reference point. This timing reference point is chosen such that signals from multiple terminals on a given frequency arrive at the reference point without a timing overlap. Terminals are assigned specific slot numbers defined at the system timing reference point. Such a timing reference point is typically chosen to be the satellite antenna L-band antenna. The timing reference is also the same for both uplink and downlink signals. Since the delay between the satellite and individual terminals can vary depending on the physical location of the terminal within the coverage area, each terminal creates its own local timing reference with respect to the satellite based upon receipt of the synchronization signal. All downlink transmissions from the satellite to a particular terminal is subsequently done with respect to the local timing reference derived by the terminal.

As illustrated in FIG. 3, the synchronization signal is transmitted a predetermined amount of time in advance such that it arrives on time slots 6 and 7 of the system timing reference. More particularly, the gateway initiates transmission of the synchronization signal at 310 based, in part, on knowledge of the time required for signals to travel from its RFT antenna to the satellite. As previously discussed, the system timing reference is based on the satellite L-band antenna, which is used to communicate with the terminals. At 312, the satellite forwards the synchronization signal to all terminals within the coverage area. The synchronization signal is received by the second terminal at 314. At 320, a first terminal (UT1) transmits data on an uplink path to the satellite. The data is received at the satellite L-band antenna on time slots 9, 10, and 11.

The satellite transmits the data from the first terminal (UT1) to the gateway along a downlink path at 322. Due to transmission and processing delays, the data from the satellite arrives at the gateway at a time which is later than the time slots corresponding to the system timing reference (satellite L-band). At 330, the gateway processes the data for transmission to the second terminal (UT2). Accordingly, the gateway supplies the data on an uplink path to the satellite such that it arrives on time slots 14, 15, and 16. Similar to the synchronization signal, the gateway transmits the data a predetermined amount of time in advance so that its arrival is synchronized with time slots for the system timing reference. At 332, the satellite transmits the data on a downlink path to the second terminal. As illustrated in FIG. 3, the distance between the synchronization signal received by the second terminal and the start of the data from the satellite corresponds to an integer number of time slots. Accordingly, it is possible for the second terminal to properly receive the data.

Figure 4:
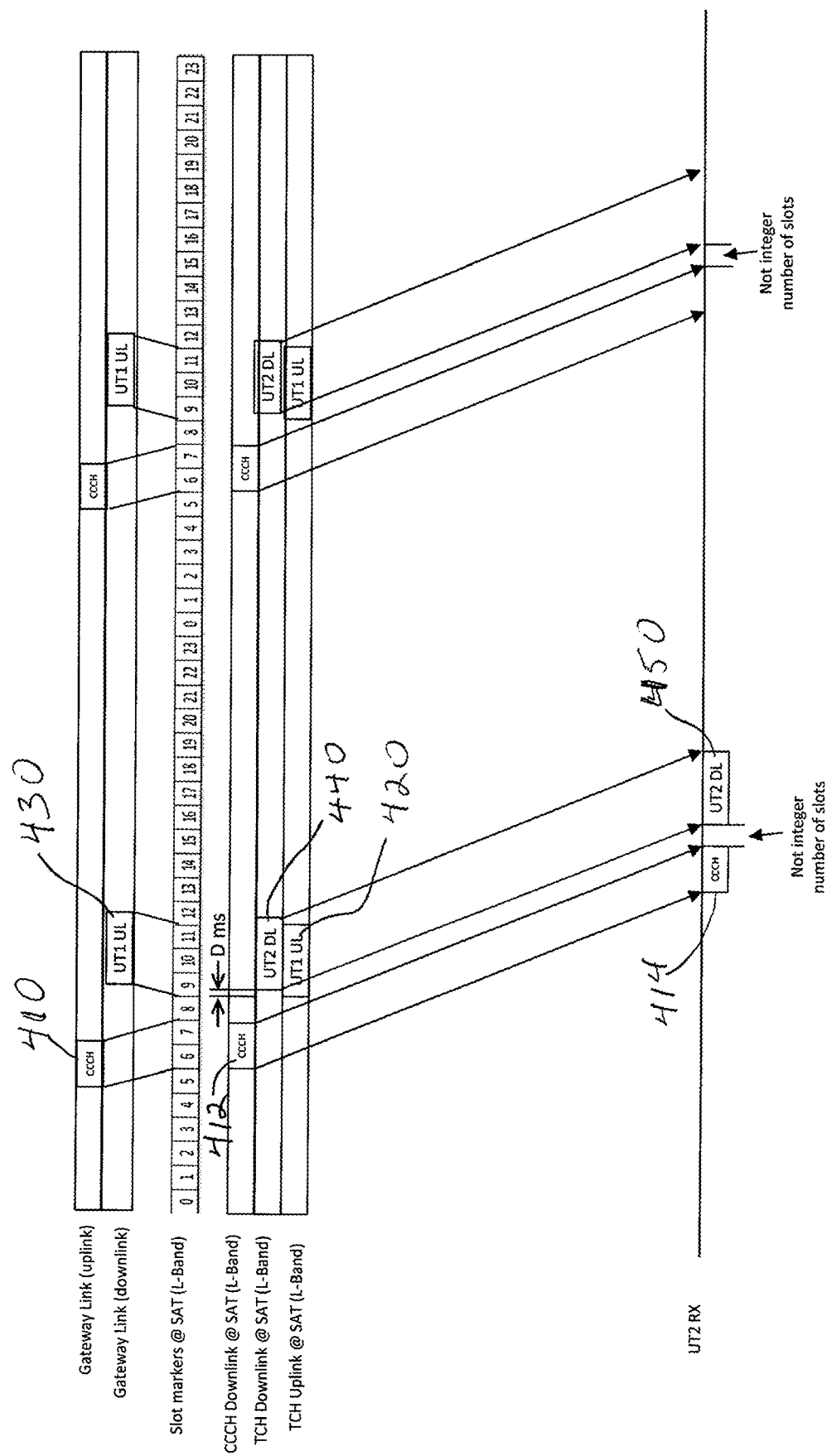
FIG. 4 is a diagram for illustrating timing changes that occur during single-hop communication sessions.

FIG. 4 illustrates timing changes that occur when single-hop connectivity is attempted between two terminals. At 410, the gateway transmits the synchronization signal (or CCCH) such that it arrives at the satellite on time slots 6 and 7, corresponding to the system timing reference. At 412, the satellite forwards the synchronization signal to all terminals within the coverage area. The synchronization signal is received by the second terminal (UT2) at 414. At 420, uplink data from the first terminal (UT1) is received at the satellite. The uplink data arrives at the satellite on time slots 9, 10, and 11. For conventional double-hop connectivity, the data from the first terminal would be transmitted from the satellite to the gateway at 430. Since this is a single-hop session between the first terminal and the second terminal, however, the satellite transmits the data directly to the second terminal. This occurs at 440. Prior to transmitting the data to the second terminal, the satellite must perform some processing to switch between uplink and downlink transmission with the terminals. Such processing requires a predetermined amount of time before the data can be transmitted to the second terminal. The processing delay is indicated as D ms.

Figure 5:
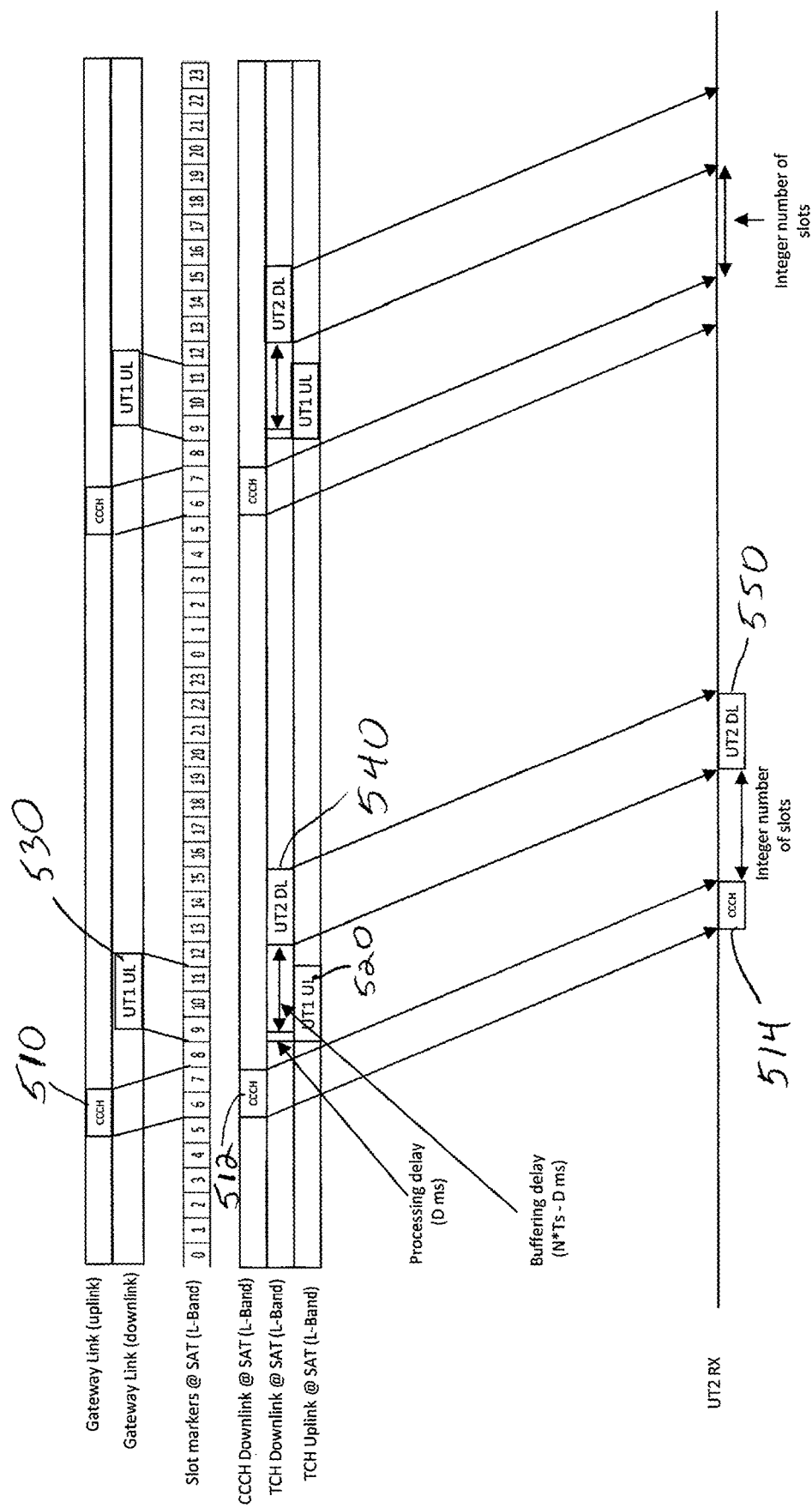
FIG. 5 is a diagram for illustrating timing for single-hop connectivity, according to at least one embodiment.

At 440, the satellite transmits the data to the second terminal. As illustrated in FIG. 4, the data cannot be transmitted at the start of time slot 9 due to the processing delay. Accordingly, the downlink data to the second terminal (at 440) is not aligned with the start of the time slot for the system timing reference. When the data arrives at the second terminal at 450, it cannot be properly received because the distance between the synchronization signal and the data does not correspond to an integer number of slots. Consequently, a single-hop communication session between the first terminal and the second terminal cannot be established FIG. 5 illustrates timing for single-hop connectivity in accordance with at least one embodiment. At 510, the gateway transmits a synchronization signal for arrival at the satellite on slots 6 and 7 of the system timing reference. At 512, the satellite forwards the synchronization signal to all terminals within the coverage area. The second terminal (UT2) receives the synchronization signal at 514. At 520, the first terminal (UT1) transmits data which arrives at the satellite on slots 9, 10, and 11. In double-hop sessions, the data from the first terminal would be transmitted to the gateway at 530. For single-hop connectivity, however, the data from the first terminal (UT1) is transmitted directly to the second terminal (UT2) by the satellite. Furthermore, the satellite experiences a processing delay of D ms when it switches between uplink and downlink transmissions with the terminals.

According to at least one embodiment, the satellite includes circuitry, including memory, to establish a storage buffer. The buffer can be used, in part, to temporarily hold data that must be transmitted to and from the satellite. According to the illustrated embodiment, the buffer can be used, in part, to store the data received from the first terminal prior to transmission to the second terminal. The buffer delay can be based, for example, on the number of time slots used to carry the data, the time slot duration, and the processing delay. The buffering delay can be calculated, therefore, as:

$$\text{Buffering delay} = N*Ts - D$$

where:
N is a positive integer,
Ts is the slot duration, and
D is the processing delay in satellite for switching uplink to downlink for single-hop connectivity.

The buffering delay accounts for the processing delay at the satellite antenna as well as the total number of time slots used to carry the data from the first terminal. At 540, the satellite transmits the data to the second terminal beginning on slots 13, 14, and 15. More particularly, the buffer stores the data received on slots 9, 10, and 11, and the satellite begins transmission of the data at the start of next slot following the processing delay. The buffer, therefore, allows the satellite to store the data from the first terminal for a sufficient length of time so as to transmit the data beginning on slot 13. The data arrives at the second terminal at 550. Accordingly, an integer number of slots will exist between the synchronization signal and the start of the data received from the satellite, thereby allowing the second terminal to properly receive the data.

Figure 6:
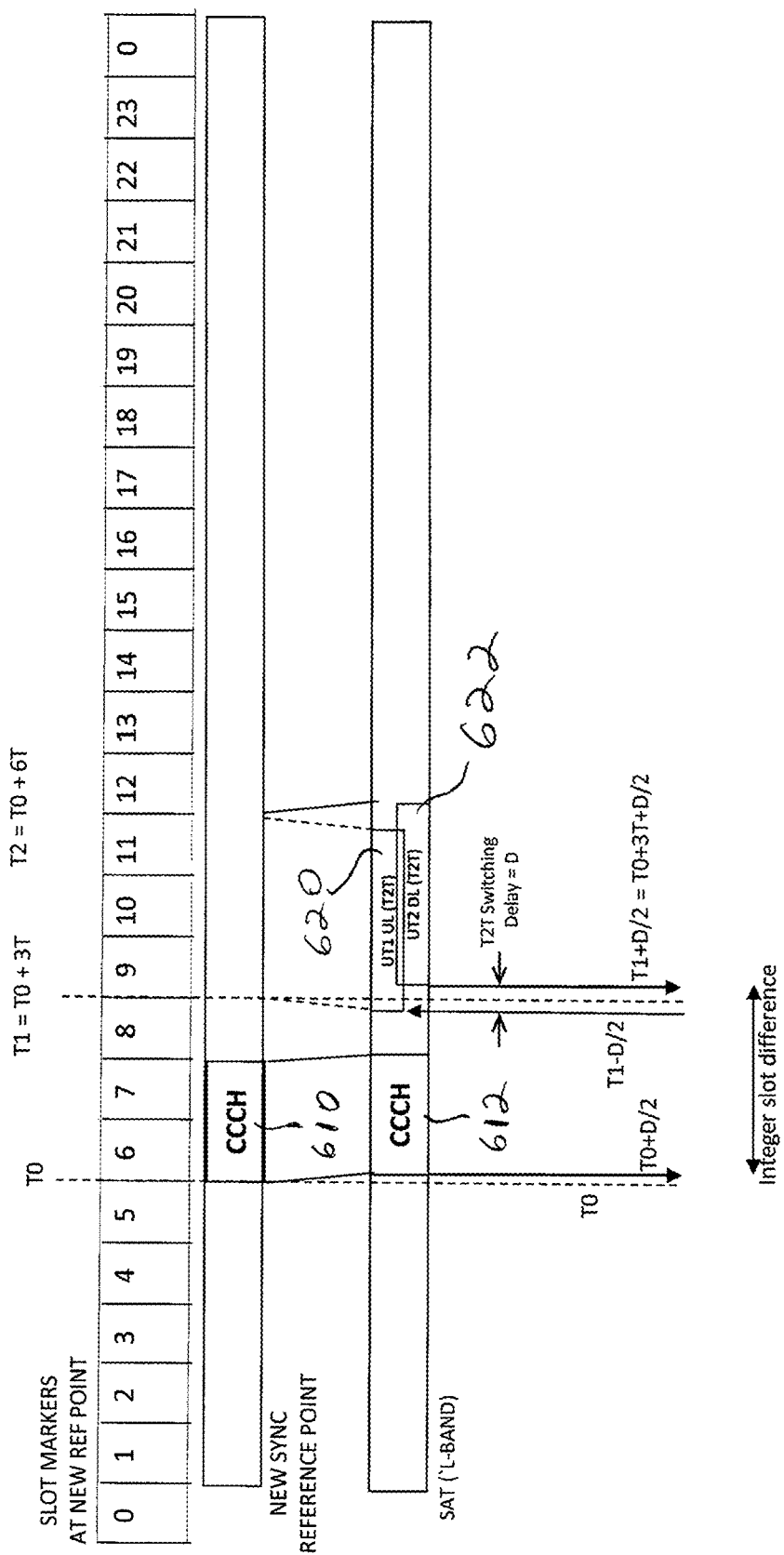
FIG. 6 is a diagram for illustrating timing for single-hop connectivity according to various embodiments.

FIG. 6 illustrates timing for single-hop connectivity, in accordance with one or more embodiments. For purposes of explaining features of this embodiment, FIG. 6 only shows the original synchronization reference point (satellite antenna) and new synchronization reference points for clarity. It should be noted that the gateway link transmissions and receptions are all aligned as previously discussed. A common timing reference (or new synchronization reference point) is established based on a predetermined timing offset. The duration of each time slot as well as the total number of slots per frame remain the same. According to at least one embodiment, the timing offset can be selected such that it corresponds to one half the satellite processing delay time, i.e., D/2.

According to the embodiment illustrated in FIG. 6, the timing offset is selected such that the common timing reference is advanced ahead of the system timing reference by one half of the duration of the satellite processing delay D. At 610, the gateway transmits the synchronization signal (CCCH) aligned with slot 6 of the common timing reference (or new synchronization reference point). In other words, the common timing reference is D/2 ms away from the satellite antenna away from the perspective of a terminal, such as UT1. However, the common timing reference is D/2 ms closer from the perspective of the gateway. For a single-hop call, user terminal UT1's uplink transmission signal is received at the satellite antenna D/2 ms earlier than the common timing reference (or new synchronization reference point). The satellite switches user terminal UT1's traffic and transmits on downlink transmission D ms later. Therefore, the downlink transmission departs the satellite antenna D/2 ms after common timing reference. The CCCH arrives from gateway at new satellite reference, and therefore it departs the satellite antenna D/2 ms after new reference. User terminal UT2 subsequently receives the CCCH and UT1 traffic in the downlink transmission such that they are separated by integer number of time-slots. In addition to single-hop sessions, all other sessions (including double-hop sessions) will also use the common timing reference.

Figure 7:
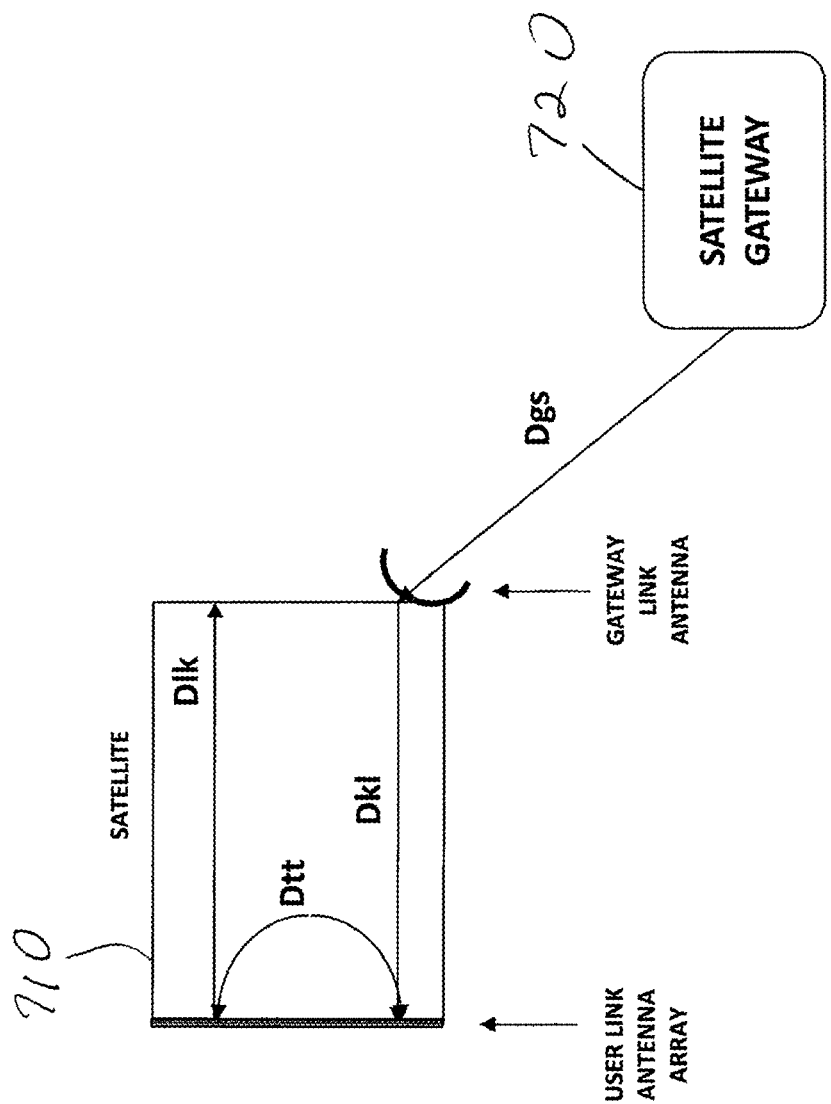
FIG. 7 is a diagram illustrating timing delays in transmission and processing of signals, according to one embodiment.

Referring additionally to FIG. 7, the gateway also accounts for other delays associated with transmitting the synchronization signal to the satellite. FIG. 7 is a diagram illustrating the timing delays in transmitting and processing of signals between the satellite 710 and the gateway 720. Dgs corresponds to the transmission delay between the gateway and the satellite. Dkl corresponds to the delay between Ka-band antenna and L-band antenna at the satellite, while Dlk is the delay between L-band antenna and Ka-band antenna at the satellite. Dtt corresponds to the processing delay for switching between uplink and downlink in satellite in order to maintain single-hop sessions. Based on these timing delays, the gateway will transmit signals to satellite Dgs+Dkl−(Dtt/2) ms ahead of the time required to reach the new reference point.

At 612, the synchronization signal (CCCH) is received at the satellite L-band antenna. Since the common timing reference is advanced by one half of the satellite processing delay, the synchronization signal's arrival at the satellite L-band antenna is delayed from its normal arrival which would occur at T0. Rather, the synchronization signal arrives at the satellite L-band antenna at time T0+D/2. At 620, the first terminal (UT1) transmits data to the satellite such that it arrives earlier than normal on the system timing reference. Specifically, the data from the first terminal arrives early by one half of the satellite processing delay, i.e., T1−D/2.

At 622, the satellite transmits the data to the second terminal (UT2) with a delay corresponding to one half of the satellite processing delay (D/2). As illustrated in FIG. 6, the data from the first satellite arrives early by one half of the processing delay (D/2), while the data is transmitted to the second terminal by one half of the processing delay (D/2). Accordingly, the terminal to terminal switching delay becomes equal to the satellite processing delay. Specifically, the data arrives at the second terminal at time T1 plus D/2 as further illustrated in FIG. 6, this results in an integer number of slots between the start of the synchronization signal and downlink data for the second terminal at the satellite L-band antenna.

Although not illustrated in FIG. 6, the common timing reference can also be used for double-hop communication sessions. For example, the first terminal's uplink data would be transmitted to the gateway and received on slots 9, 10, and 11. The gateway would subsequently transmit the downlink data for the second terminal on slots 13, 14, and 15. Similar to the synchronization signal, the data would be advanced by one half of the satellite processing delay, and arrives at the satellite L-band antenna at time T0+7T+D/2. The resulting distance from the synchronization signal would also be an integer number of slots.

Figure 8:
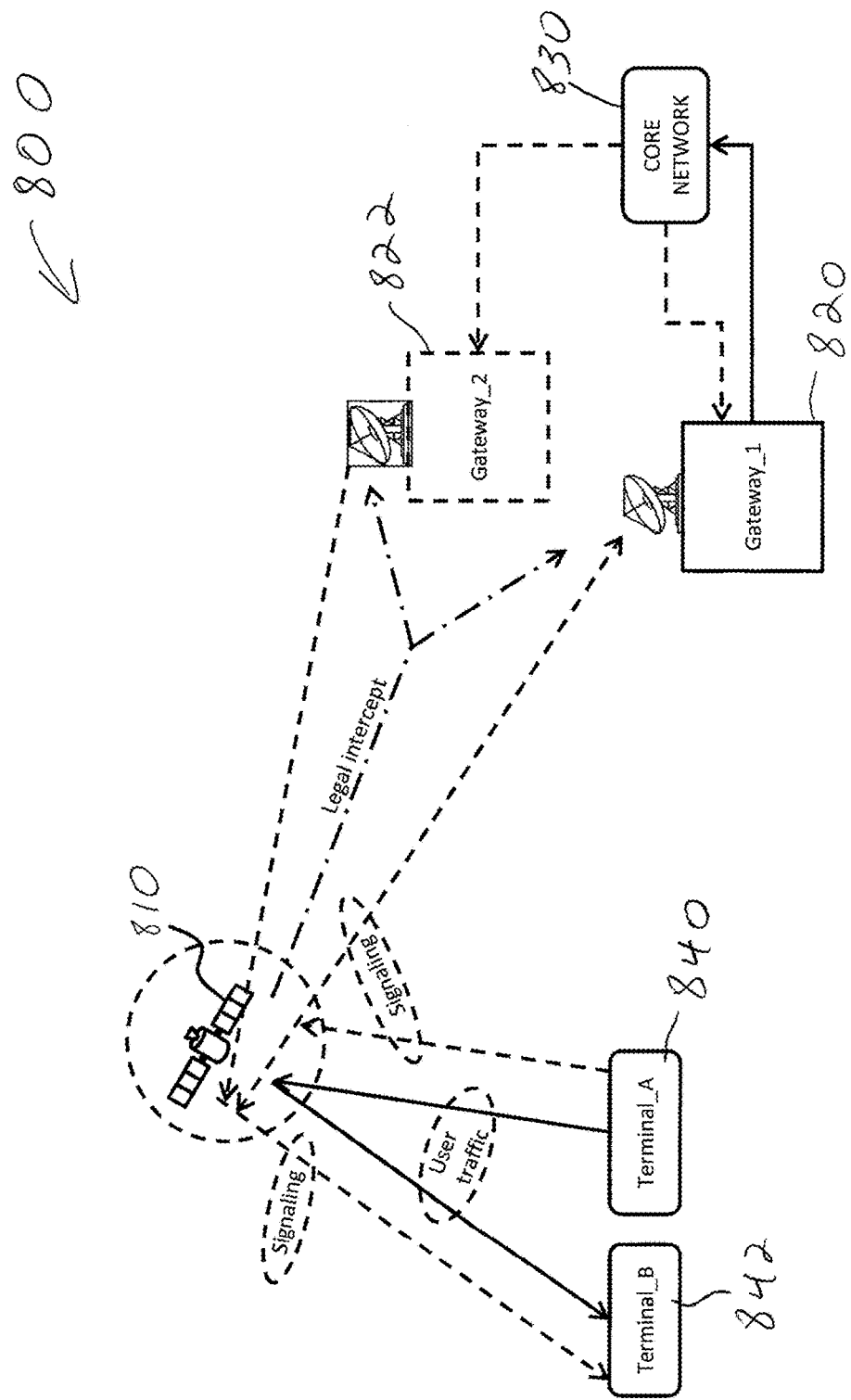
FIG. 8 is a diagram of a system for providing single-hop communication sessions, according to various embodiments.

FIG. 8 illustrates a system 800 for providing single-hop communication sessions. The system 800 includes a satellite 810, a first gateway 820, and a second gateway 822. The gateways (820, 822) operate in a manner similar to that described with respect to FIG. 1. For example, the first gateway 820 can be configured to manage communication within multiple beams generated by the satellite 810 over a particular coverage area. Similarly, the second gateway 822 can be configured to manage multiple beams generated by the satellite 810. It should be noted that various embodiments may be configured to utilize a single gateway 820 to manage all beams within the coverage area. Furthermore, certain embodiments can include additional gateways to provide backup in the event of a failure or outage at the primary (single) gateway 820. The system 800 also includes a core network 830 which provides various functionality (e.g., management, records, status, etc.) pertaining to customers. The core network 830 can be configured to provide some, or all, of the functionality available from the NMS shown in FIG. 1.

According to the illustrated embodiment, the system 800 includes a first terminal 840 and a second terminal 842 that take part in single-hop a communication session. The communication session can correspond, for example, to a voice call between the first terminal 840 and the second terminal 842. According to the illustrated embodiment, the call is initiated by the first terminal 840 by transmitting signaling information to the first gateway 820 along a dedicated channel. For example, terminals in the system 800 can be configured to use two different frequencies, one for carrying user traffic and one for signaling. Furthermore, the satellite can be configured to switch the user traffic frequencies to achieve single-hop connectivity, while sending signaling information to the gateway.

The signaling information can be in the form of a request for resources necessary to establish a voice call with the second terminal 842. Upon receiving the signaling information, the first gateway 820 interacts with the core network 830 in order to obtain information regarding the first terminal 840 and/or the second terminal 842. According to at least one embodiment, the information obtained from the core network 830 can include authorization for the call based on validation of the account status associated with the first terminal 840, the second terminal 842, or both. For example, if the account associated with one of the terminals has been temporarily or permanently deactivated, the core network 830 would not authorize the call.

The core network 830 is configured to provide, in part, authorization for the call to both the first gateway 820 and the second gateway 832. For example, the core network 830 would communicate with the second gateway 822 in order to provide an indication that a call request has been received for the second terminal 842. The second gateway 822 would transmit signaling information to the second terminal 842 in order to indicate that a call request has been received. The second gateway 822 would also allocate resources, such as frequencies and time slots, to be used by the second terminal 842 during the call session. Similarly, the core network 830 provides an indication to the first gateway 820 that the call request has been authorized. The first gateway 820 would then allocate resources for the first terminal 840 to utilize during the call session. As previously discussed, certain system implementations may utilize a single gateway 840 to manage all beams in the coverage area. The signaling channel would be used by the first terminal 840 and the second terminal 842 to communicate with the gateway 820 to setup the call session. Furthermore, the first gateway 820 would allocate resources for both the first terminal 840 and the second terminal 842.

According to various embodiments, all information pertaining to the call setup is exchanged over the signaling channel. Once the call setup is complete, the first terminal 840 and the second terminal 842 utilize resources allocated by the respective gateways to establish the communication session via the satellite 810. According to at least one embodiment, the satellite 810 can be configured to incorporate a digital beamformer which allows it to extract the uplink signals from the first terminal's coverage beam and generate a downlink signal in the second terminal's coverage beam. Such a connection can reduce the perceived end-to-end delay to about 250 ms (compared to 500 ms) plus any switching delay in satellite. Such a reduction can be achieved regardless of whether the users are in different beams and using different uplink and downlink frequencies. Traffic for the communication session only travels between the satellite 810 and the terminals along a traffic channel that does not reach the gateways (820, 822). As illustrated in FIG. 8, user traffic (i.e., voice data) from the first terminal 840 is received by the satellite 810 and transmitted directly to the second terminal 842. Likewise user traffic from the second terminal 842 is received by the satellite 810 and transmitted directly to the first terminal 840.

According to one or more embodiments, the system 800 can be configured to facilitate legal intercepts and/or other restrictions involving the terminals. For example, specific rules/conditions pertaining to the legal intercept or restriction can be maintained at the gateway 820, 822, satellite 810, or both. The legal intercept can be temporary such that it pertains to specific terminals and/or specific investigations. The legal intercept can also be permanently established by a particular jurisdiction to monitor communication into the jurisdiction, communication from other jurisdictions, etc. Regardless of the specific type of legal intercept, user traffic (e.g., voice data) to/from the first terminal 840, the second terminal 842, or both can be replicated by the satellite 810 and supplied to the appropriate gateway.

According to at least one embodiment, conditions for the legal intercept or restriction can be applicable to mobile terminals as well as fixed terminals. If one of the terminals (e.g., terminal 840) is mobile, for example, there is a possibility that it can move in/out of the restricted area during communication session, such as a call. Since the communication session is a single-hop session, the gateway 820, 822 may not be aware of whether the legal intercept should be maintained or discontinued. Accordingly, the satellite 810 can be configured to store the conditions for initiating, maintaining, or cancelling the legal intercept (or restriction). The satellite 810 would therefore have the ability to determine the location of the terminal 840, and independently make the decision to initiate or terminate the legal intercept. Alternatively, the satellite 810 can be configured to notify the gateway 820, 822 anytime one of the terminals 840, 842 involved in a single-hop session crosses a geographical border. The gateway 820, 822 can query a database containing the different conditions for an intercept to determine if the current conditions meet any requirements for legal intercept, data preservation, etc. The gateway 820, 822 can subsequently inform the satellite 810 to send copies of the necessary transmissions (e.g., voice, data, location, etc.) back to the gateway 820, 822.

The system illustrated in FIG. 8 advantageously addresses security issues associated with double-hop connectivity. For example, user data transmission between the two terminals is switched at the satellite, without reaching the ground segment (e.g., gateway). The terminals negotiate the keys to be used for the session on the traffic channel after the call setup is completed. Accordingly, user data interception can be virtually eliminated. Furthermore, call quality can be improved because voice transcoding will no longer occur at the gateway, thus eliminating possible signal degradation.

Figure 9:
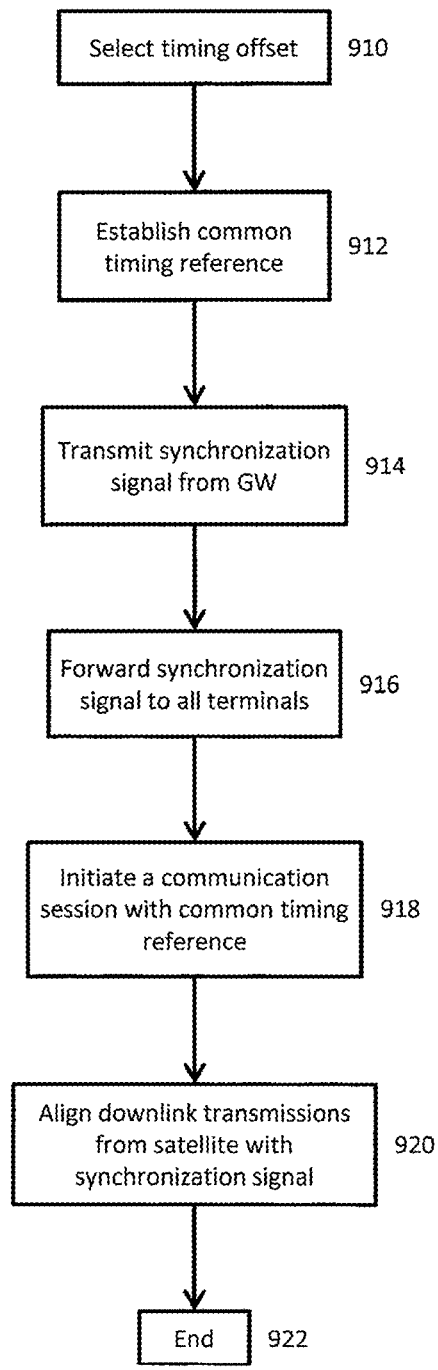
FIG. 9 is a flowchart of a process for single-hop communication sessions, according to one or more embodiments.

FIG. 9 is a flowchart illustrating a process for single-hop communication sessions, according to one or more embodiments. At 910, a timing offset is selected. As previously discussed, the timing offset can be based on a system timing reference that is used to synchronize transmission and reception of signals via the satellite. At 912, a common timing reference is established. According to an embodiment, the common timing reference can be based on the timing offset as well as the system timing reference. At 914, a synchronization signal is transmitted from the gateway. The synchronization signal can be transmitted along a common channel that is shared by all terminals within the system. Furthermore, the synchronization signal can be transmitted at predetermined intervals so that it can be properly received by all terminals. For example, the synchronization signal can be transmitted from the gateway to the satellite based on predetermined time slots that are aligned with the common timing reference.

At 916, the synchronization signal is forwarded to all terminals from the satellite. According to the disclosed embodiments, the synchronization signal is delayed by a value which corresponds to the timing offset selected at 910. Depending on the specific system configuration, the synchronization signal can be transmitted to all terminals in the system if only a single gateway is utilized. In systems that incorporate multiple gateways, each gateway would transmit a synchronization signal to all terminals located within the beams managed by the particular gateway. At 918, a communication session is established by at least one of the terminals using the common timing reference. For example, the communication session can involve other terminals in the system or external devices (e.g., landline, cell phone, etc.). At 920, downlink transmissions from the satellite to the terminals are aligned with the synchronization signal. The process ends at 922.

Figure 10A:
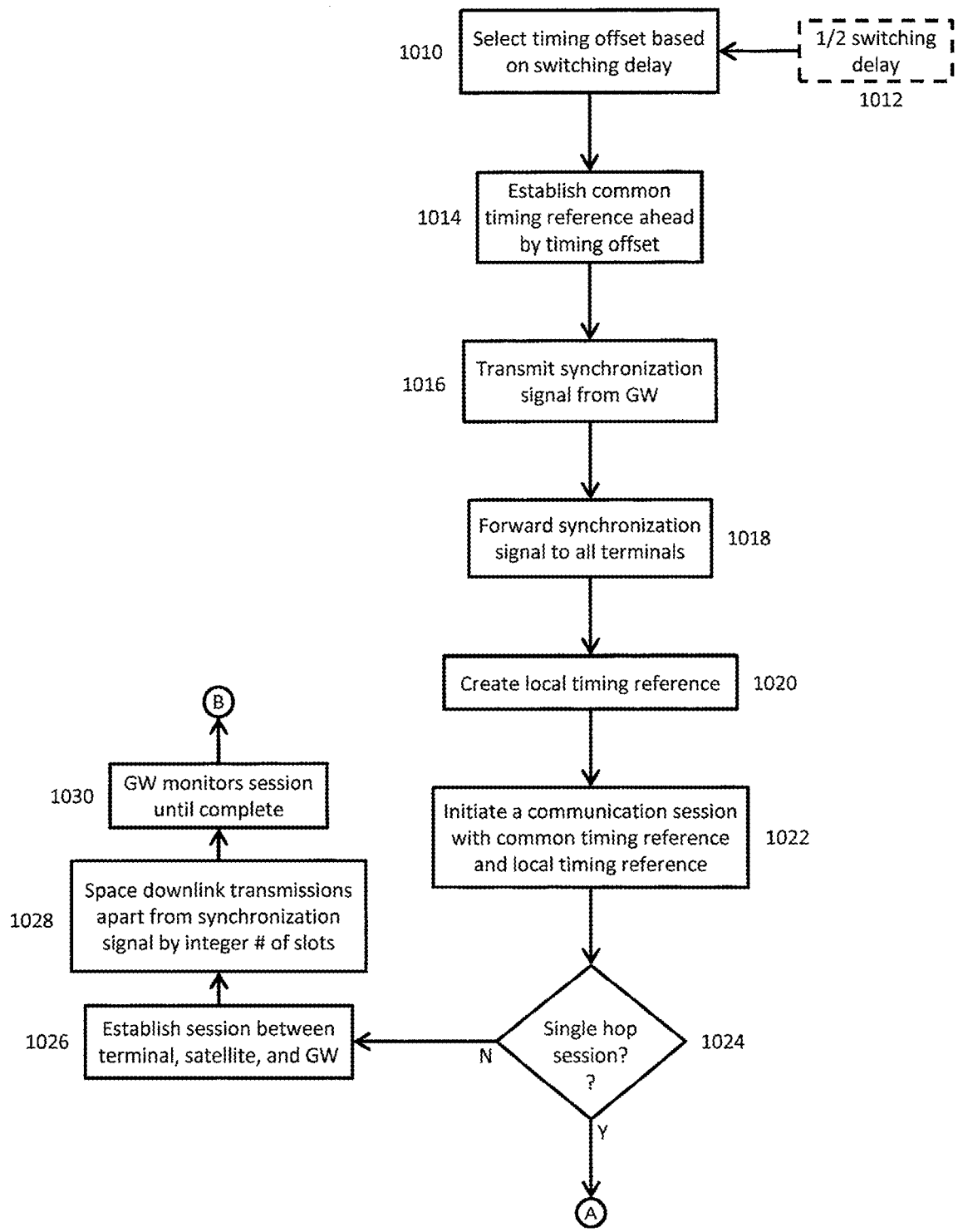
FIGS. 10A and 10B are a flowchart of a process for single-hop communication sessions, according to various embodiments.
Figure 10B:
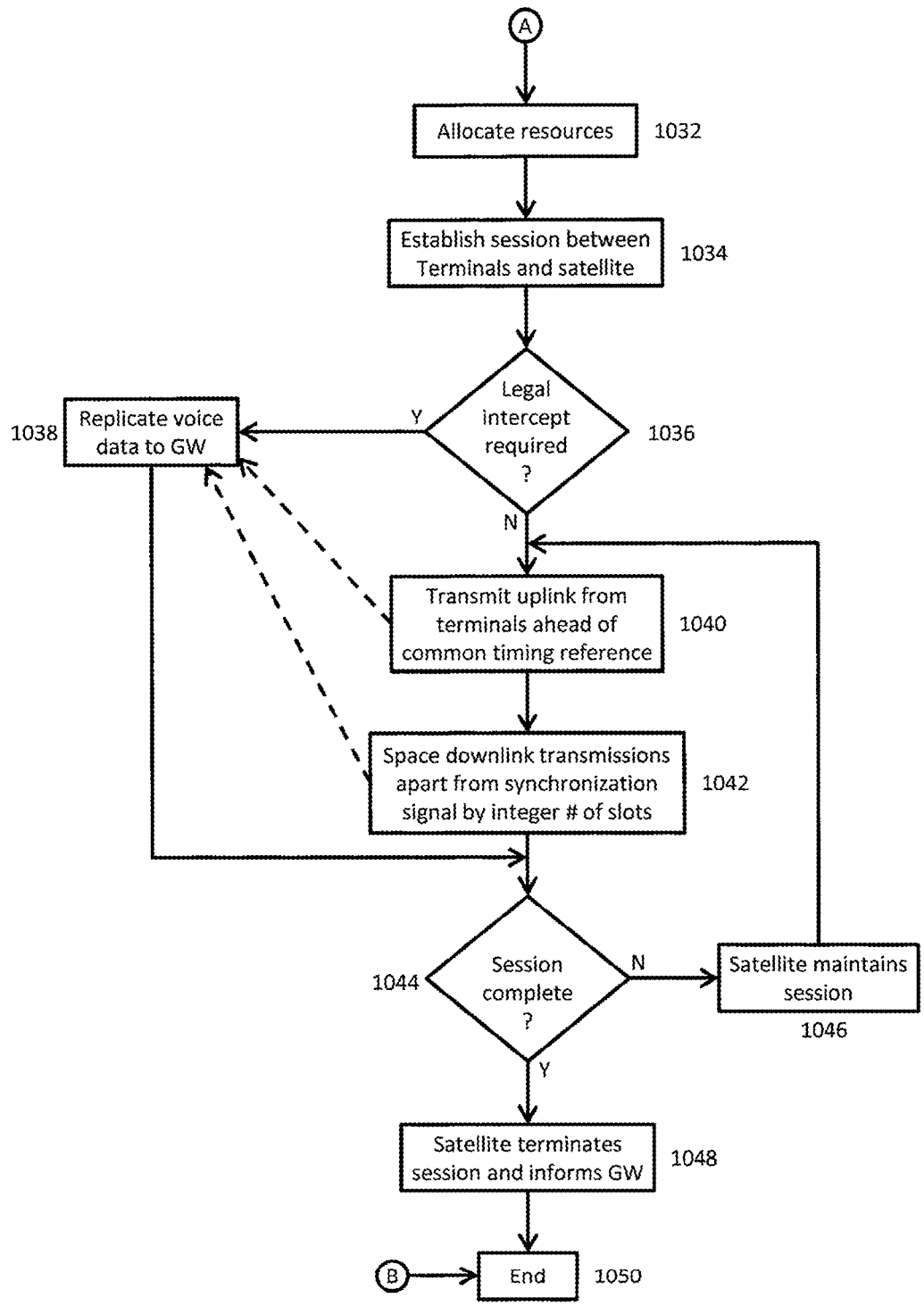

FIGS. 10A and 10B are a flowchart illustrating a process for single-hop communication sessions, according to various embodiments. At 1010, a timing offset is selected based on a switching delay for the satellite. As previously discussed, the switching delay can correspond to a satellite processing delay time for switching between uplink and downlink transmissions with the terminals. According to at least one embodiment, the timing offset can be selected to be one half of the satellite switching delay (D/2). This is indicated at 1012. At 1014, a common timing reference is established. The common timing reference can be established, for example, such that it is ahead of the system timing reference by a value corresponding to the timing offset selected at 1010. At 1016, a synchronization signal is transmitted from each gateway within the system. As previously discussed, certain systems may incorporate a single gateway for managing all beams and terminals residing therein. Additionally, other systems can incorporate multiple gateways such that each gateway is only responsible for a portion of the beams within the system. Each gateway would therefore transmit a separate synchronization signal using the same, or different, time slots.

At 1018, the synchronization signal is forwarded to all terminals within the system such that it is delayed by a value corresponding to the selected timing offset. At 1020, a local timing reference is created by each terminal. The local timing reference can correspond, for example, to an offset representative of the variations in distance between each terminal and the satellite. At 1022, a communication session is established using the common timing reference as well as the local timing reference. At 1024, it is determined whether the communication session is a single-hop session, which would represent a direct terminal to terminal session. If it is not a single-hop session, then control passes to 1026. The communication session is established as double-hop, in part, between the terminal, the satellite, and the gateway at 1026. At 1028, downlink transmissions from the satellite are spaced apart from the synchronization signal by an integer number of slots. Depending on the specific communication session established, an additional terminal or external device (e.g., cell phone, landline, etc.) can also be part of the communication session. At 1030, the gateway monitors the session until it is completed. Control then passes to 1050. Although not illustrated in FIG. 10, a double-hop session will also include various setup steps to allocate resources for the communication session. Furthermore, certain procedures such as legal intercepts can also be performed during the double-hop process.

If the communication session is determined to be single-hop, then the gateway allocates resources at 1032. Such resources can include, for example, transmission frequencies, slot allocations, etc. At 1034, the communication session is established between the two terminals and the satellite. As previously discussed, single-hop sessions occur in such a manner that the session proceeds without interaction with the gateway once resources have been allocated. Thus, the single-hop session can be between two terminals or multiple terminals. At 1036, it is determined whether a legal intercept is required. Such legal intercepts can be mandated by local or regional authorities, for example, if a crime has been detected with respect to one of the terminals involved in the communication session. Furthermore, certain permanent type legal intercepts can be established by foreign jurisdictions based on call origination, call destination, or both.

If a legal intercept is required, then control passes to 1038 where all voice data is replicated at the satellite and forwarded to the gateway. Depending on the specific type of legal intercept, voice data can be replicated from a single terminal or all terminals involved in the communication session. Control then passes to 1044. If a legal intercept is not required, then uplink data from the terminals are transmitted to the satellite ahead of the common timing reference. This is indicated at 1040. At 1042, downlink transmissions from the satellite to the terminals are spaced apart from the synchronization signal by an integer number of slots. As previously indicated certain legal intercepts may require replication of voice data originating from one or multiple terminals involved in the communication session. Accordingly, uplink transmissions from the terminals as well as downlink transmissions from the satellite can be replicated and supplied to the gateway. This is indicated by the dashed arrows from 1040 and 1042.

At 1044, it is determined whether the communication session has completed. If the communication session has not completed (i.e., is still active), then the satellite maintains the communication session at 1046. Control then returns to 1040, where voice data continues to be exchanged between the terminals and the satellite. If it is determined that the session is complete, however, then control passes to 1048. At 1048, the satellite terminates the session and informs the gateway. This information can be used by the gateway so that the resources previously assigned for the single-hop session can be reallocated. The process ends at 1050.

Various features described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. For example, such hardware/software/firmware combinations can be incorporated into the previously described terminals, receivers, transmitters, transceivers, gateway, core unit, NMS, satellite, etc. Furthermore, various features can be implemented using algorithms illustrated in the form of flowcharts and accompanying descriptions. Some or all steps associated with such flowcharts can be performed in a sequence independent manner, unless otherwise indicated. Those skilled in the art will also understand that features described in connection with one Figure can be combined with features described in connection with another Figure. Such descriptions are only omitted for purposes of avoiding repetitive description of every possible combination of features that can result from the disclosure.

The terms software, computer software, computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C#, Python, R, Fortran, COBOL, assembly language, markup languages (e.g., HTML, SGML, XML, VoXML), Java, JavaScript, etc. As used herein, the terms processor, microprocessor, digital processor, and CPU are meant generally to include all types of processing devices including, without limitation: single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Such exemplary hardware for implementing the described features are detailed below.

Figure 11:
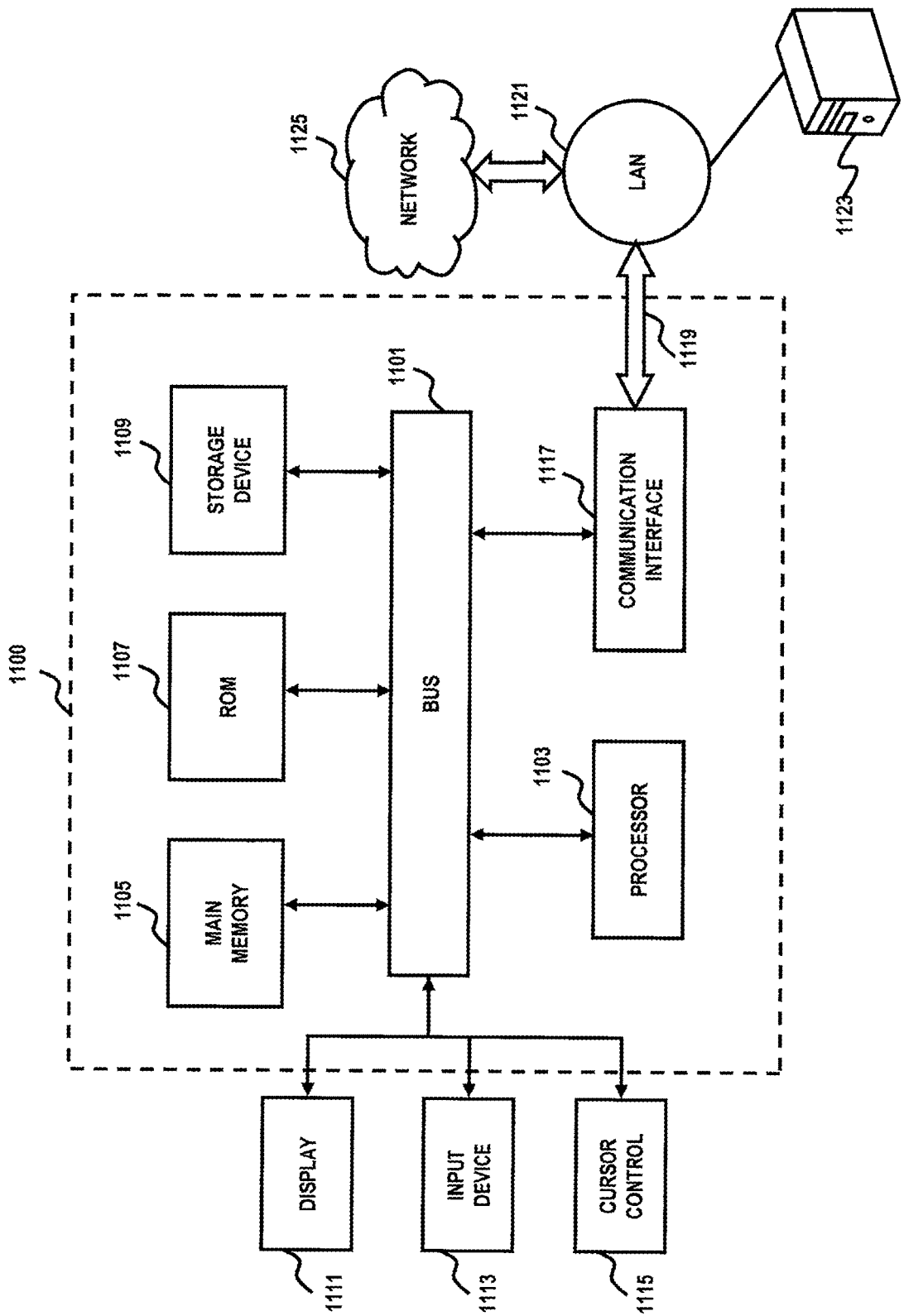
FIG. 11 is a diagram of a computer system that can be used to implement various exemplary features and embodiments.

FIG. 11 is a diagram of a computer system that can be used to implement features of various embodiments. The computer system 1100 includes a bus 1101 or other communication mechanism for communicating information and a processor 1103 coupled to the bus 1101 for processing information. The computer system 1100 also includes main memory 1105, such as a random access memory (RAM), dynamic random access memory (DRAM), synchronous dynamic random access memory (SDRAM), double data rate synchronous dynamic random-access memory (DDR SDRAM), DDR2 SDRAM, DDR3 SDRAM, DDR4 SDRAM, etc., or other dynamic storage device (e.g., flash RAM), coupled to the bus 1101 for storing information and instructions to be executed by the processor 1103. Main memory 1105 can also be used for storing temporary variables or other intermediate information during execution of instructions by the processor 1103. The computer system 1100 may further include a read only memory (ROM) 1107 or other static storage device coupled to the bus 1101 for storing static information and instructions for the processor 1103. A storage device 1109, such as a magnetic disk or optical disk, is coupled to the bus 1101 for persistently storing information and instructions.

The computer system 1100 may be coupled via the bus 1101 to a display 1111, such as a light emitting diode (LED) or other flat panel displays, for displaying information to a computer user. An input device 1113, such as a keyboard including alphanumeric and other keys, is coupled to the bus 1101 for communicating information and command selections to the processor 1103. Another type of user input device is a cursor control 1115, such as a mouse, a trackball, or cursor direction keys, for communicating direction information and command selections to the processor 1103 and for controlling cursor movement on the display 1111. Additionally, the display 1111 can be touch enabled (i.e., capacitive or resistive) in order facilitate user input via touch or gestures.

According to an exemplary embodiment, the processes described herein are performed by the computer system 1100, in response to the processor 1103 executing an arrangement of instructions contained in main memory 1105. Such instructions can be read into main memory 1105 from another computer-readable medium, such as the storage device 1109. Execution of the arrangement of instructions contained in main memory 1105 causes the processor 1103 to perform the process steps described herein. One or more processors in a multi-processing arrangement may also be employed to execute the instructions contained in main memory 1105. In alternative embodiments, hard-wired circuitry may be used in place of or in combination with software instructions to implement exemplary embodiments. Thus, exemplary embodiments are not limited to any specific combination of hardware circuitry and software.

The computer system 1100 also includes a communication interface 1117 coupled to bus 1101. The communication interface 1117 provides a two-way data communication coupling to a network link 1119 connected to a local network 1121. For example, the communication interface 1117 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 1117 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 1117 sends and receives electrical, electromagnetic, or optical signals that carry digital data streams representing various types of information. Further, the communication interface 1117 can include peripheral interface devices, such as a Universal Serial Bus (USB) interface, a High Definition Multimedia Interface (HDMI), etc. Although a single communication interface 1117 is depicted in FIG. 11, multiple communication interfaces can also be employed.

The network link 1119 typically provides data communication through one or more networks to other data devices. For example, the network link 1119 may provide a connection through local network 1121 to a host computer 1123, which has connectivity to a network 1125 such as a wide area network (WAN) or the Internet. The local network 1121 and the network 1125 both use electrical, electromagnetic, or optical signals to convey information and instructions. The signals through the various networks and the signals on the network link 1119 and through the communication interface 1117, which communicate digital data with the computer system 1100, are exemplary forms of carrier waves bearing the information and instructions.

The computer system 1100 can send messages and receive data, including program code, through the network(s), the network link 1119, and the communication interface 1117. In the Internet example, a server (not shown) might transmit requested code belonging to an application program for implementing an exemplary embodiment through the network 1125, the local network 1121 and the communication interface 1117. The processor 1103 may execute the transmitted code while being received and/or store the code in the storage device 1109, or other non-volatile storage for later execution. In this manner, the computer system 1100 may obtain application code in the form of a carrier wave.

The term "computer-readable medium" as used herein refers to any medium that participates in providing instructions to the processor 1103 for execution. Such a medium may take many forms, including but not limited to non-volatile media, volatile media, and transmission media. Non-volatile media include, for example, optical or magnetic disks, such as the storage device 1109. Non-volatile media can further include flash drives, USB drives, microSD cards, etc. Volatile media include dynamic memory, such as main memory 1105. Transmission media include coaxial cables, copper wire and fiber optics, including the wires that comprise the bus 1101. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 12:
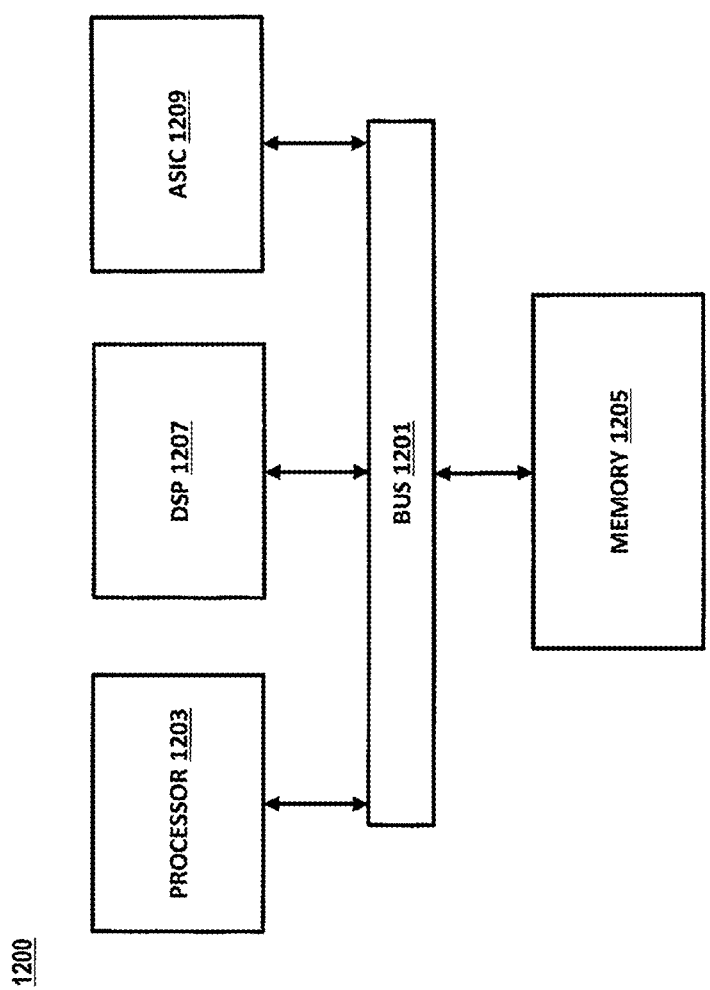
FIG. 12 is a diagram of a chip set that can be used to implement various exemplary features and embodiments.

FIG. 12 illustrates a chip set 1200 upon which features of various embodiments may be implemented. Chip set 1200 is programmed to implement various features as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1200, or a portion thereof, constitutes a means for performing one or more steps of the figures.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein. The memory 1205 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
   selecting a timing offset based on a system timing reference;
   establishing a common timing reference based on the timing offset and the system timing reference;
   transmitting a synchronization signal from a gateway to a satellite based on time slots aligned with the common timing reference;
   forwarding the synchronization signal, delayed by a value of the timing offset, on a downlink transmission from the satellite to all terminals managed by the gateway; and
   initiating a communication session, by at least one terminal, using the common timing reference,
   wherein downlink transmissions from the satellite to the terminals are aligned with the synchronization signal in reference to a TDMA frame.

2. The method of claim 1, further comprising:
   creating a local timing reference at each terminal based on the synchronization signal,
   wherein uplink transmissions from each terminal are based on its local timing reference, the common timing reference, and the timing offset.

3. The method of claim 1, wherein the timing offset is further based on a satellite processing delay time for switching between uplink and downlink of transmissions with the terminals.

4. The method of claim 3, wherein:
   the timing offset is ½ the satellite processing delay time; and
   the common timing reference is advanced by a value of the timing offset relative to the system timing reference.

5. The method of claim 1, wherein downlink transmissions from the satellite to the terminals are spaced an integer number of time slots away from the synchronization signal in reference to the TDMA frame.

6. The method of claim 1, wherein uplink transmissions from the at least one terminal are received at the satellite in advance of their assigned time slots on the common timing reference, based on timing offset.

7. The method of claim 6, wherein uplink transmissions from the at least one terminal are received at the satellite early by ½ the satellite processing delay.

8. The method of claim 1, wherein:
   the communication session is a double-hop session between the at least one terminal, the satellite, and the gateway; and
   downlink transmissions from the satellite to the at least one terminal are spaced an integer number of slots from the synchronization signal.

9. The method of claim 1, wherein:
   the communication session is a single-hop session between two selected terminals and the satellite; and
   the communication session is based on resources allocated by the gateway.

10. The method of claim 9, wherein:
    uplink transmissions from one of the selected terminals arrive at the satellite early by a value of the timing offset; and
    downlink transmissions to the other selected terminal are transmitted from the satellite late by a value of the timing offset.

11. The method of claim 9, wherein the satellite is configured to maintain and terminate the single-hop session.

12. The method of claim 1, further comprising forwarding a copy of transmissions from at least one of the selected terminals to the gateway.

13. The method of claim 12, wherein the copy of transmissions is forwarded based, at least in part, on a legal intercept requirement from a government entity.

14. A system comprising:
    a plurality of terminals;
    at least one gateway; and
    a satellite configured to facilitate communication between the plurality of terminals and the at least one gateway,
    wherein the at least one gateway is configured to:
      select a timing offset based on a system timing reference,
      establish a common timing reference based on the timing offset and the system timing reference, and
      transmit a synchronization signal to a satellite based on time slots aligned with the common timing reference,
    wherein the satellite is further configured to forward the synchronization signal, delayed by a value of the timing offset, on a downlink transmission to all terminals managed by the gateway,
    wherein each of the terminals is configured to initiate a communication session using the common timing reference, and
    wherein downlink transmissions from the satellite to the terminals are aligned with the synchronization signal in reference to a TDMA frame.

15. The system of claim 14, wherein each of the terminals is further caused to:
    create a local timing reference based on the synchronization signal; and
    supply uplink transmissions to the satellite based on the local timing reference, the common timing reference, and the timing offset.

16. The system of claim 14, wherein the timing offset is further based on a satellite processing delay time for switching between uplink and downlink of transmissions with the terminals.

17. The system of claim 14, wherein downlink transmissions from the satellite to the terminals are spaced an integer number of time slots away from the synchronization signal in reference to the TDMA frame.

18. The system of claim 14, wherein:

the communication session is a double-hop session between at least one terminal from the plurality of terminals, the satellite, and the gateway; and the satellite is further configured to space downlink transmissions to the at least one terminal an integer number of slots from the synchronization signal.

19. The system of claim 14, wherein:

the communication session is a single-hop session between two selected terminals and the satellite; and the gateway is further configured to allocate resources for the communication session during a session setup process.

20. A system comprising:

a plurality of terminals;

at least one gateway configured to:
- transmit a synchronization signal to the plurality of terminals based on time slots aligned with a system timing reference, and
- allocate resources for communication sessions; and a satellite comprising:
- a first antenna for communicating with the gateway;
- a second antenna for communicating with the plurality of terminals; and
- a buffer for storing data received from the plurality of terminals,
- wherein the satellite is configured to establish single-hop communication sessions between a first terminal and at least one additional terminal based on resources allocated by the gateway, wherein the satellite is further configured to:
- store data received during uplink transmissions from the first terminal in the buffer during a single-hop communication session,
- reconfigure the second antenna from uplink to downlink transmission, and
- transmitting data stored in the buffer to the at least one additional terminal, and wherein downlink transmissions from the satellite to the at least one additional terminal are aligned with the synchronization signal in reference to a TDMA frame.

\* \* \* \* \*